United States Patent [19]

Vaahs et al.

[11] Patent Number: 5,081,080
[45] Date of Patent: Jan. 14, 1992

[54] POLYMERIC HYDRIDOSILAZANES, PROCESSES FOR THE PREPARATION THEREOF, SILICON NITRIDE-CONTAINING CERAMIC MATERIALS WHICH CAN BE PREPARED THEREFROM, AND THE PREPARATION THEREOF

[75] Inventors: Tilo Vaahs, Kelkheim; Thomas Gerdau; Marcellus Peuckert, Eppstein; Martin Brück, both of Hofheim am Taunus, all of Fed. Rep. of Germany

[73] Assignee: Hoechst Aktiengesellschaft, Frankfurt am Main, Fed. Rep. of Germany

[21] Appl. No.: 512,732

[22] Filed: Apr. 20, 1990

Related U.S. Application Data

[62] Division of Ser. No. 289,901, Dec. 23, 1988.

[51] Int. Cl.$^5$ .............. C04B 35/58; C04B 35/52; C08G 77/06; C08G 77/12
[52] U.S. Cl. .............................. 501/97; 501/96; 501/92; 528/10; 528/22; 528/31
[58] Field of Search .............. 501/96, 97, 92; 528/10, 528/22, 31

Primary Examiner—William R. Dixon, Jr.
Assistant Examiner—Michael Marchechi

[57] ABSTRACT

The invention relates to novel polymeric hydridosilazanes, their preparation, their conversion into silicon nitride-containing ceramic material, and this material itself. To prepare the polymeric hydridosilazanes, polymeric hydridothiosilazanes are reacted with $NH_3$. To prepare the silicon nitride-containing ceramic material, the polymeric hydridosilazanes are then pyrolyzed.

8 Claims, No Drawings

POLYMERIC HYDRIDOSILAZANES, PROCESSES FOR THE PREPARATION THEREOF, SILICON NITRIDE-CONTAINING CERAMIC MATERIALS WHICH CAN BE PREPARED THEREFROM, AND THE PREPARATION THEREOF

This application is a division of copending application Ser. No. 07/289,901, filed on Dec. 23, 1988. Priority is expressly claimed and based upon papers filed in this parent application pending.

The present invention relates to novel polymeric hydridosilazanes, the preparation thereof, the conversion thereof to silicon nitride-containing ceramic material, and this material itself. The silicon nitride-containing ceramic material is obtained from the polymeric hydridosilazanes by pyrolysis and predominantly comprises silicon nitride containing some silicon carbide and carbon.

Pyrolysis of polysilazanes to silicon nitride/SiC-containing ceramic material has already been described in the literature (R. R. Wills et al., Ceramic Bulletin, Vol. 62 (1983), 904–915).

Chlorosilanes are generally employed as the starting materials for the preparation of polysilazanes and are reacted with ammonia or primary or secondary amines (U.S. Pat. No. 4,540,803, U.S. Pat. No. 4,543,344, U.S. Pat. No. 4,595,775, U.S. Pat. No. 4,397,728 and U.S. Pat. No. 4,482,669).

The present invention makes available novel starting materials for silicon nitride-containing ceramic materials, namely polymeric hydridosilazanes, also called "polyhydridosilazanes" below.

The present invention relates to a process for the preparation of polymeric hydridosilazanes, which comprises reacting polymeric hydridothiosilazanes of the formula

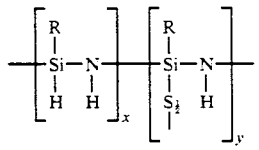

where R is $C_1$–$C_6$-alkyl or $C_2$–$C_6$-alkenyl, and x and y denote the molar fractions of the two structural units, with excess $NH_3$. R is preferably methyl or vinyl.

The polymeric hydridothiosilazanes employed as starting materials, also called "polyhydridothiosilazanes" below, can be obtained by reacting oligohydridoalkylsilazanes of general formula $(RSiHNH)_n$ in which n is approximately 3 to 12 and R is $C_1$–$C_6$-alkyl or $C_2$–$C_6$-alkenyl, with elemental sulfur in an ether as solvent at 30° to 120° C. The reaction is preferably carried out at 60° to 80° C.

The oligohydridoalkylsilazanes $(RSiHNH)_n$ required as starting materials for the polyhydridothiosilazanes can in turn be obtained by reacting a dichlorohydridoalkylsilane of the formula $RSiHCl_2$ where R is as defined above, with excess $NH_3$ in a solvent, as described in U.S. Pat. No. 4,482,669 (see therein, in particular, columns 4, 5, 7 and 8). In this reaction, a mixture of linear and cyclic oligomers having various chain length n is generally produced.

The radical R in the oligohydridoalkylsilazanes $(RSiHNH)_n$ (also, abbreviated to "oligosilazanes" below) is preferably methyl or vinyl.

The molar ratio between sulfur and the RSiHNH unit of the oligosilazane is preferably about 0.1:1 to 1:1, in particular 0.6:1 to 0.8:1, in the preparation of the polymeric hydridothiosilazanes.

To link up the reactants with one another, the oligosilazanes are initially introduced in an ether as solvent, and the sulfur is added, generally in portions. It dissolves in the solution of the oligosilazane, on which it initially imparts a yellow coloration. The coloration disappears again to the extent to which the sulfur reacts with the oligosilazanes. 40–60% of the sulfur employed are incorporated into the polysilazane produced, the rest escaping as $H_2S$.

The reaction duration depends on the reaction temperature. In general, a reaction time of from 1 to 7 hours is sufficient. Suitable solvents are ethers, such as THF, diethylene glycol diethyl ether etc.

The polymeric hydridothiosilazanes are then obtained by removing the solvent by distillation under reduced pressure.

If desired, the process can also be carried out under reduced pressure. Pressures in the range 1 to 10 atmospheres can also be used.

The polyhydridothiosilazanes can also be prepared by a continuous procedure.

Accordingly, the present invention also relates to a process for the preparation of polymeric hydridosilazanes, which comprises reacting polymeric hydridothiosilazanes with excess $NH_3$, the polymeric hydridothiosilazanes being obtained by reacting oligohydridoalkylsilazanes of the general formula $(RSiHNH)_n$ in which n is approximately 3 to approximately 12 and R is $C_1$–$C_6$-alkyl or $C_2$–$C_6$-alkenyl, with elemental sulfur in an ether as solvent at 30° to 120° C.

The polymeric hydridothiosilazanes employed as starting materials have a molecular structure which can be represented by the formula

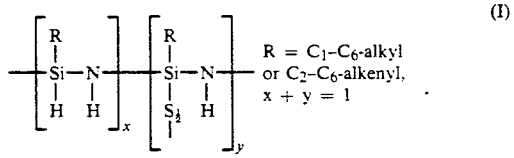 (I)

In this formula, the value of y is a measure of the sulfur content of the polysilazane. The silicon atoms here are not bonded directly to one another, but instead via NH groups or S atoms. The Si:N ratio in the polymeric hydridothiosilazanes is approximately 1:1 to 1.2:1. The greater the ratio between sulfur and the RSiHNH unit of the oligosilazane, the higher the value of y (and correspondingly the lower the value of x). The values of x and y in each case can be determined by integration of the $^1H$ NMR spectra and by elemental analysis. Preferred polymeric hydridothiosilazanes are those in which the values for y are 0.6 to 0.8, in particular 0.7 to 0.8. As stated, these values can be adjusted via the relative content of sulfur in the reaction mixture and can be checked via the analytical methods mentioned. The preferred values for x and y just mentioned have proven particularly successful if a solid, soluble polyhydridothiosilazane is to be produced as the end product of the reaction. This prerequisite is necessary if molding to monoliths, fibers etc. is intended.

The polymeric hydridothiosilazanes are converted according to the invention into polyhydridosilazanes by reaction with ammonia ("ammonolysis"); the polyhydridosilazanes are in turn converted by pyrolysis into silicon nitride-containing ceramic material.

The ammonolysis can be carried out in liquid $NH_3$. However, it is advantageous to carry it out in an organic solvent. All solvents which are inert to the polyhydridothiosilazanes are suitable.

Preferred solvents are those in which the ammonium sulfide produced as a byproduct has low solubility and good separability, for example ethers, aliphatic and aromatic hydrocarbons, and chlorinated hydrocarbons. In the ammonolysis, the reactants can be introduced into the reaction vessel in any desired sequence. However, it is usually advantageous to initially introduce the polyhydridothiosilazane in solution and to introduce gaseous ammonia or to add liquid ammonia. The ammonolysis is carried out using an excess of $NH_3$ in order to ensure that the reaction is complete and that the end products are as free from sulfur as possible. In general, twice the stoichiometric amount is sufficient for this purpose, the stoichiometric amount of $NH_3$ being 3 y where y is again the molar fraction of the sulfur-containing structural unit of the polymeric hydridothiosilazane. If the polyhridothiosilazanes were prepared in a suitable organic solvent, the ammonolysis according to the invention can be carried out in this solvent subsequent thereto and without isolation of the polyhdridothiosilazanes.

In general, the reaction is carried out at a temperature of from approximately $-50°$ to $+100°$ C., preferably $-20°$ to $+30°$ C., in particular at room temperature (with ice cooling). However, it is also possible to carry out the reaction above room temperature, for example at the boiling point of the solvent used, or below room temperature, for example at $-33°$ C. when using liquid $NH_3$.

During ammonolysis of the polyhydridothiosilazanes of the formula I, reactions of the sulfur-containing structural unit of the polyhydridothiosilazanes occur:

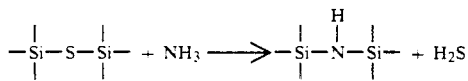

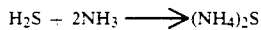

In these reactions, substantially sulfur-free polyhydridosilazanes are produced. The stoichiometric amount of $NH_3$ is accordingly 3 moles of $NH_3$ per mole of S.

Accordingly, the present invention furthermore relates to polymeric hydridosilazanes of the formula

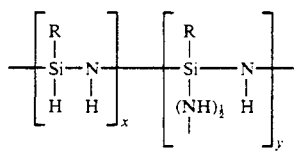

where R is $C_1$-$C_6$-alkyl or $C_2$-$C_6$-alkenyl and x and y denote the molar fraction of the two structural units. In this formula, $x+y=1$. R is particularly preferably methyl or vinyl.

The invention furthermore relates to polymeric hydridosilazanes which can be obtained by reacting polymeric hydridothiosilazanes with excess $NH_3$, the polymeric hydridothiosilazanes being obtainable by reacting oligohydridoalkylsilazanes of the general formula $(RSiHNH)_n$ in which n is approximately 3 to approximately 12, and R is $C_1$-$C_6$-alkyl or $C_2$-$C_6$-alkenyl, with elemental sulfur in an ether as solvent at 30° to 120° C. R is preferably methyl or vinyl.

The polyhydridosilazanes obtained can be pyrolyzed in an inert atmosphere at temperatures of from 800° to 1200° C. to form amorphous, impermeable materials which contain silicon nitride and may also contain traces of H and O. The inert atmosphere here may comprise $N_2$, Ar or He, but $N_2$ or Ar is preferably used. At pyrolysis temperatures of greater than 1200° C., such as in the range 1200° C. to 1400° C., partly amorphous, microcrystalline ceramic materials which contain α-silicon nitride as the crystalline phase are produced.

A particular advantage is that the polyhydridosilazanes can, before pyrolysis, be shaped by various processes to form three-dimensional shaped articles. The invention therefore furthermore relates to a process for the preparation of silicon nitride-containing ceramic material, which comprises pyrolyzing the polymeric hydridosilazanes defined above by means of their structural formula or by means of the process for their preparation, in an inert atmosphere at 800° to 1400° C.

An important method of shaping is the drawing of fibers. In this case, fibers can be drawn from high-viscosity solutions of the polyhydridosilazane in solvents, such as toluene, THF or hexane. The fibers are advantageously drawn by means of spinnerets 80 to 150 μm in diameter. The filament is tapered by subsequent stretching so that a very strong filament 2 to 20 μm, in particular 5 to 15 μm, in diameter is produced after pyrolysis. The filament is subsequently dried in air or inert gas. The fibers produced by subsequent pyrolysis are used as mechanical reinforcement inclusions in fiber-reinforced aluminum, aluminum alloys and ceramic components.

A further important way of processing the polyhydridosilazanes is the production of impermeable, highly adherent, amorphous or microcrystalline ceramic coatings on metals, in particular steels, or on ceramics such as $Al_2O_3$, $ZrO_2$, MgO, SiC or silicon nitride. The coating is produced using a solution of the polyhydridosilazane in organic solvents such as toluene, THF or hexane. Pyrolytic conversion into an amorphous or microcrystalline coating is carried out in the same temperature range of from 800° to 1200° C. or 1200° to 1400° C., under an inert gas, as described above in the case of three-dimensional shaped articles.

Due to their excellent adhesion, great hardness and surface quality, the ceramic coatings are particularly suitable for surface finishing of machine components which are subjected to mechanical load and chemical attack.

In addition, the above-described polyhydridosilazanes can also be pyrolyzed in an $NH_3$ atmosphere at 800°-1400° C. instead of in an inert gas, in an equally high ceramic yield of 70 to 90%. This results in a practically carbon-free, glass-clear, colorless material. In the case of pyrolysis in $NH_3$ at 1000° C. or higher, the C content is less than 0.5% by weight. Depending on the pyrolysis temperature, the pyrolysis product comprises virtually pure amorphous silicon nitride (pyrolysis below 1200° C.) or crystalline silicon nitride (pyrolysis above 1200° C., preferably above 1300° C.). Pyrolysis in NH₃ can be used for all the shaped articles produced by the above-described shaping processes, i.e. articles, fibers and coatings formed from polyhydridosilazane powder.

EXPERIMENTAL REPORT 1

(Preparation of oligohydridomethylsilazane $(CH_3SiHNH)_n$)

100 ml (0.97 mol) of methyldichlorosilane were dissolved in 800 ml of absolute THF, and ammonia was passed into the solution (flow rate: 0.5 l/min) for 3 hours. The reaction temperature was kept in the range 20° to 25° C. by cooling with an ice bath. In order to complete the reaction, the mixture was stirred at room temperature for 1 hour, and the ammonium chloride was subsequently separated off under argon. The precipitate was washed twice with 350 ml of THF in each case, and the combined THF solutions were evaporated under reduced pressure. A clear, readily mobile oil of $(CH_3SiHNH)_n$ was obtained in a yield of 44.5 g=78% of theory.

EXPERIMENTAL REPORT 2

(Preparation of polymeric hydridothiosilazane)

0.1 mol of oligohydridomethylsilazane $(CH_3SiHNH)_n$ (number of moles based on the monomer unit in parentheses) was dissolved under nitrogen in 40 ml of THF in a round-bottomed flask fitted with reflux condenser and stirrer, and the mixture was heated to reflux. A constant, slow stream of nitrogen was passed over the mixture, and the exhaust gas was passed into chlorine bleaching lye, where the volatile, strong-smelling sulfur compounds produced during the reaction with sulfur were converted into odorless oxidation products.

0.07 mol of sulfur was added in portions. The $CH_3SiHNH$:sulfur ratio was thus 1:0.7. The sulfur dissolved completely to form a yellow solution. The color disappeared slowly to the extent to which the sulfur reacted with the SiH groups, i.e. over the course of 2 hours.

The mixture was subsequently cooled, and the solvent was removed by distillation under reduced pressure at room temperature. 6.1 g of a solid, white residue remained. This had a Si:N ratio of 1:0.83 and a sulfur content of 8% by weight, to which the following structure corresponds:

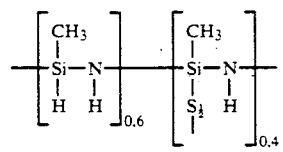

The 6.1 g of the polymeric hydridothiosilazane obtained thus correspond to a yield of 94%.

EXAMPLE 1

5 g of the polymeric hydridothiosilazane of Experimental Report 2 (0.077 mol of the monomer unit $—[CH_3SiH—NH]_{0.6}—[CH_3SiS_{\frac{1}{2}}—NH]_{0.4}$) were dissolved in 40 ml of THF. Ammonia was passed in at 0° C. until saturation had been achieved. During this time, a bulky, yellow precipitate was deposited. This was separated off, and the clear solution was freed from solvent, with 3.9 g of a colorless solid remaining. Analysis showed a Si:N ratio of 1:1.14, i.e. an enrichment of nitrogen over silicon of 30% compared with the sulfur-containing educt (see Experimental Report 2).

This corresponds to the formula below:

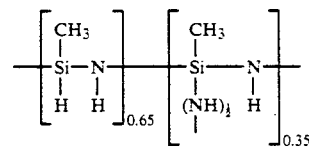

The yield thus works out at 81%.

EXAMPLE 2

0.1 Mol of oligosilazane (number of moles based on the monomer unit $CH_3SiHNH$) was dissolved in 50 ml of THF, and the solution was heated to boiling. 0.05 Mol of sulfur was added to the solution in portions. During boiling, nitrogen was constantly passed over the mixture, and the exhaust gas was passed into chlorine bleaching lye. The mixture was refluxed until the yellow color of the reaction solution disappeared, i.e. for about 2 hours. The mixture was cooled, and ammonia was passed in at 0° C. until saturation had been achieved. During this time, a bulky, yellow precipitate was deposited and was separated off. The volatile components of the filtrate were removed by distillation at a reduced pressure at 20° C. The high-viscosity polysilazane material remained; this solidified at 0° C. and had a viscous, oily consistency at higher temperatures. The product exhibited an Si:N ratio of 1:1.1. This corresponds to the following formula:

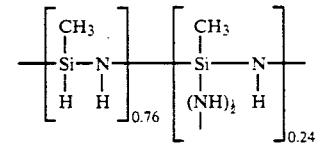

The yield was 5 g (82%). A mean value of 1150 g/mol was found in a molecular weight determination.

EXAMPLE 3

0.44 Mol (25.9 g) of oligohydridomethylsilazane (number of moles based on the monomer unit $CH_3SiHNH$) was dissolved in 400 ml of THF. Nitrogen was again passed over the mixture and the exhaust gas was passed into chlorine bleaching lye. The THF was heated to reflux, and 0.31 mol (9.8 g) of sulfur was added in portions. This corresponded to a molar ratio between the $CH_3SiHNH$ monomer unit and sulfur of 1:0.7.

When the reaction was complete, ammonia was passed in at 0° C. to saturation, whereupon a yellow, bulky precipitate formed, was filtered off and weighed 10.1 g after drying. This was 0.15 mole of ammonium sulfide, which corresponds to half the amount of sulfur employed. The filtrate was freed from solvent, producing a colorless solid. The yield was 25.4 g.

Analysis gave a Si:N ratio of 1:1.1. This corresponds to the formula below:

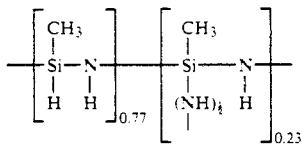

On the pyrolysis of this compound in a nitrogen atmosphere at 1200° C., a silicon nitride-containing ceramic material was obtained in a ceramic yield of 71% by weight.

We claim:

1. A process for the preparation of a ceramic material, which comprises pyrolyzing a polymeric hydridosilazane of the formula

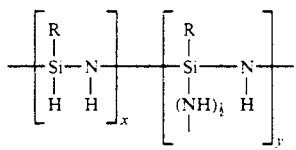

in which R is $C_1$–$C_6$-alkyl or $C_2$–$C_6$-alkenyl and x and y denote the molar fractions of the two structural units, and $x+y=1$, in an inert atmosphere at 800° to 1,400° C.

2. A process for the preparation of silicon nitride-containing ceramic material, which comprises pyrolyzing a polymeric hydridosilazane as claimed in claim 1 in an $NH_3$ atmosphere at 800° to 1400° C.

3. The process as claimed in claim 1, wherein, in order to produce silicon nitride-containing ceramic fibers, the polymeric hydridosilazane is initially dissolved in an organic solvent, and fibers are drawn from this solution and pyrolyzed after evaporation of the solvent.

4. The process as claimed in claim 1, wherein, in order to produce silicon nitride-containing ceramic shaped articles, the pulverulent polymeric hydridosilazane is pressed to form shaped articles before pyrolysis.

5. The process as claimed in claim 1, wherein, in order to produce silicon nitride-containing ceramic coatings, the polymeric hydridosilazane is initially dissolved in an organic solvent, and a coating is produced using this solution and pyrolyzed after evaporation of the solvent.

6. The process as claimed in claim 1, wherein the pyrolysis is carried out at 800° to 1200° C.

7. The process as claimed in claim 1, wherein the pyrolysis is carried out at 1200° to 1400° C.

8. Silicon nitride-containing ceramic material obtainable by the process as claimed in claim 1.

* * * * *